United States Patent [19]

Iwabuchi

[11] Patent Number: 5,160,178
[45] Date of Patent: Nov. 3, 1992

[54] DIRECT SEALING COUPLING

[75] Inventor: Toshiaki Iwabuchi, Chigasaki, Japan

[73] Assignee: Kabushiki Kaisha COM, Japan

[21] Appl. No.: 809,008

[22] Filed: Dec. 17, 1991

[51] Int. Cl.⁵ .............................................. F16L 25/00
[52] U.S. Cl. .................................. 285/328; 285/354; 285/917
[58] Field of Search ............ 285/354, 386, 328, 334.4, 285/272, 917

[56] References Cited

U.S. PATENT DOCUMENTS

| | | |
|---|---|---|
| 3,058,761 | 10/1962 | Christophersen ............... 285/354 X |
| 3,672,704 | 6/1972 | Christianson ................ 285/334.4 X |
| 4,660,868 | 4/1987 | Totani .................................. 285/354 |
| 4,685,707 | 8/1987 | Miyashita ........................... 285/328 |
| 4,811,976 | 3/1989 | Yagisawa ............................ 285/328 |

FOREIGN PATENT DOCUMENTS

| | | | |
|---|---|---|---|
| 258656 | 12/1967 | Fed. Rep. of Germany ...... 285/272 |
| 485885 | 5/1938 | United Kingdom ................ 285/272 |
| 661137 | 11/1951 | United Kingdom ................ 285/354 |
| 1152759 | 5/1969 | United Kingdom ............ 285/334.4 |

Primary Examiner—Dave W. Arola
Attorney, Agent, or Firm—Hayes, Soloway, Hennessey & Hage

[57] ABSTRACT

A body is engaged with a sleeve by a direct sealing coupling. The sleeve has a flange at one end acting as a belleville spring. The flange has a sleeve sealing surface and a rear annular projection. The body has a body sealing surface at one end. The sleeve sealing surface has a conical angle and comes in contact with the body sealing surface by a female nut, a female thread of which is engaged with a male thread of the body, thereby applying fastening force onto the rear annular projection to form sealing between the body and the sleeve.

2 Claims, 2 Drawing Sheets

DIRECT SEALING COUPLING

BACKGROUND OF THE INVENTION

The present invention relates to a direct sealing coupling which requires no sealing material such as a gasket and metal O- and C-rings.

With insertion of sealing material such as a gasket and metal O- and C-rings, large pipes are connected by a bolt and a nut with a flange, and relatively smaller pipes are connected with a female nut.

For example, FIG. 4 illustrates a known sealing coupling for connecting relatively smaller pipes with a female nut 101. A gasket 104 and an end portion 106 of a sleeve 105 are engaged in an annular groove 103 at the end of the body 102. Adjacent the end of the sleeve 106, a flange 107 is formed to encircle the sleeve 106, and a thrust bearing 108 is provided between the flange 107 and the female nut 101. A female thread 109 is formed on the inner surface of the female nut 101, and a male thread 110 on the outer surface of the body 102 is engaged with the female thread 109. To form sealing by connecting the sleeve 105 with the body 102, the female nut 101 is engaged with the body 102, so that force is applied to the flange 107 via the thrust bearing 108, and the gasket 104 is collapsed between the end faces of the sleeve 105 and the body 102, whereby sealing is formed.

However, there are disadvantages in the known art as follows:

a) With the gasket 105, there is unevenness at the connection of an opening 111 of the sleeve 105 and an opening 112 in the body 102, so that flow disturvance in the openings 111 and 112 occurs.

b) When a gasket is used, it would be partially pressed by strong force, and for preventing the gasket from falling, an overlapped portion is formed between the body and the sleeve.

c) When parts such as a sleeve and a body is taken out upwardly by removing a female nut, the body has to be forcedly separated from the sleeve until the overlapped portion of the body and the sleeve disappears, thereby causing damage to conduits connected to each.

d) When the coupling is disassembled, the gasket is liable to fall, and assembling is troublesome since a gasket and a retainer have to be installed.

SUMMARY OF THE INVENTION

The object of the present invention is to provide a direct sealing coupling in which parts can be easily removed and mounted from a coupling portion after assembling pipes and which requires no gaskets.

According to the present invention, there is provided a direct sealing coupling for engaging a body with a sleeve to form sealing by fastening force, the body comprising a substantially flat body sealing surface at one end; the sleeve comprising at one end a flange which acts as a belleville spring, the flange having a sleeve sealing surface which has a conical angle and having a rear surface, the fastening force being given via the rear surface of the flange to form sealing between the body sealing surface and the sleeve sealing surface.

The direct sealing coupling of the present invention has advantages as below:

A) The body sealing surface contacts the sleeve sealing surface, thereby removing a dead space for gasket etc. and unevenness in the opening.

B) Since no gasket is used, no retainer for holding it is required, thereby facilitating attachment and removal of parts.

C) In a conventional sealing coupling for pressing a gasket, for example, as illustrated in FIG. 4, there is a distance "l" at each acting point and it could not easily be deformed, so that it needs an annular projection for transferring force, which takes a length, thereby lengthening the female nut. On the contrary, the direct sealing coupling according to the present invention comprises a bellivele spring-like flange which is easily deformed, thereby decreasing its thickness and shortening the female nut itself.

DETAILED DESCRIPTION OF PREFERRED EMBODIMENTS

Figure 1:
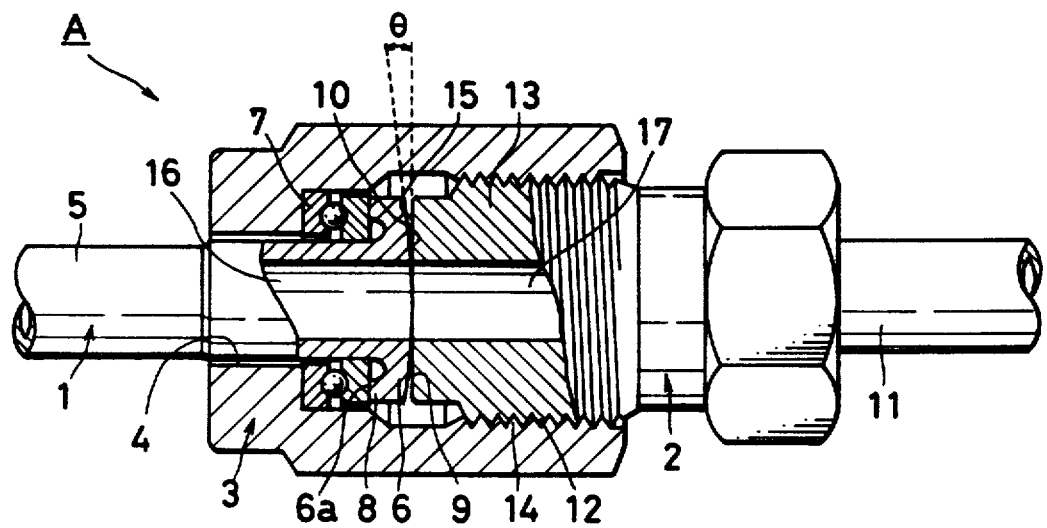
FIG. 1 is a partially sectioned view of a first embodiment of a direct sealing coupling according to the present invention just before fastening a sealing portion.
Figure 2:
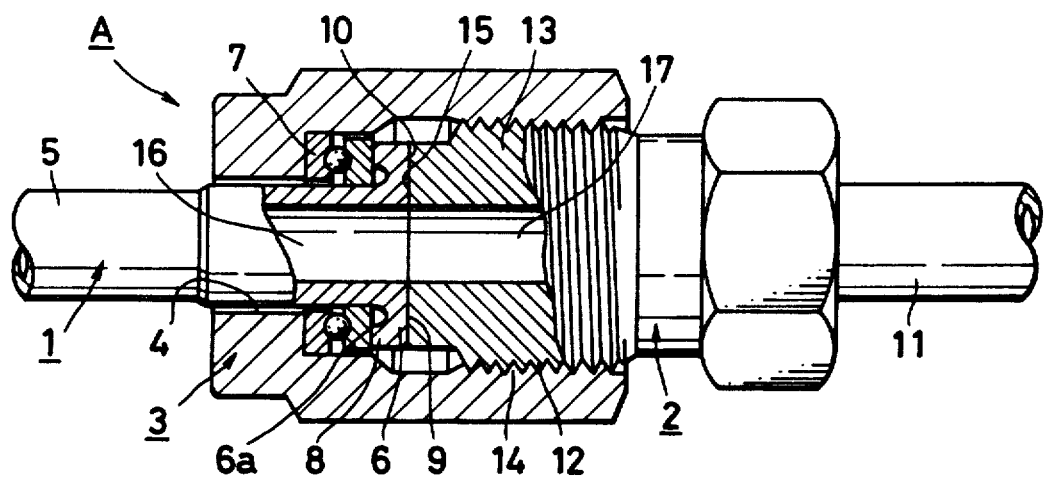
FIG. 2 is a partially sectioned view thereof after the sealing portion is fastened at maximum.

FIGS. 1 and 2 illustrate a first embodiment of the present invention, in which there is provided a sealing coupling "A" for connecting a sleeve 1 with a body 2 by a female nut 3. A tubular portion 5 of the sleeve 1 is inserted in an opening 4 of the female nut 3, and a flange 6 of the sleeve 1 is held with a thrust bearing 7. The flange 6 acts as a belleville spring, and the rear surface 6a of the flange 6 has an annular projection 8, a rear surface of which is engaged with the thrust bearing 7.

At a front surface 9 of the flange 6, there is formed a sleeve sealing surface 10 which has a conical angle "$\theta$" with respect to a vertical surface and burnished to be optically flat, which means that the sealing surface is finished as flat as possible, like a mirror. In the female nut 3, a connecting portion 13 has a larger diameter than that of the tubular portion 11 and comprises a male thread 12, which is engaged with the female thread 14 in the female nut 3. At the end face of the connecting portion 13, there is formed a substantially flat body sealing surface 15 which is burnished to be optically flat.

FIG. 1 illustrates a sleeve sealing surface 10 and a body sealing surface 15 such that the openings 16 and 17 coincide with each other, the sealing surfaces being secured with the female nut 3 to have a linear contact. When the female nut 3 is rotated in a securing direction to provide fastening force, a pressing force is applied to the rear surface 6a of the flange 6 via the thrust bearing 7 not to rotate the sleeve 1 with the female nut 3 when the sleeve sealing surface 10 is in contact with the body sealing surface 15.

The female nut 3 is suitably fastened according to sealing conditions. In FIG. 2, the sleeve 1 is fastened onto the body 2 at maximum, wherein pressing force is applied to the rear surface by raising the flange 6, so that the sealing surfaces 10 and 15 comes in contact with each other by area or two-dimesionally.

In FIG. 2, in addition to linear contact sealing around opening, area- or two-dimensional-contact is made, thereby increasing sealing capability. The coupling "A" in FIGS. 1 and 2 has no sealing material such as a gasket, whereby sealing is formed without dead-space for sealing material and without unevenness inside the opening.

Further, no overlapping portion of the sleeve and the body 2 could be formed. In disassembling, by removing the female nut 3, parts may be taken out parallel with the sealing surface.

Figure 3:
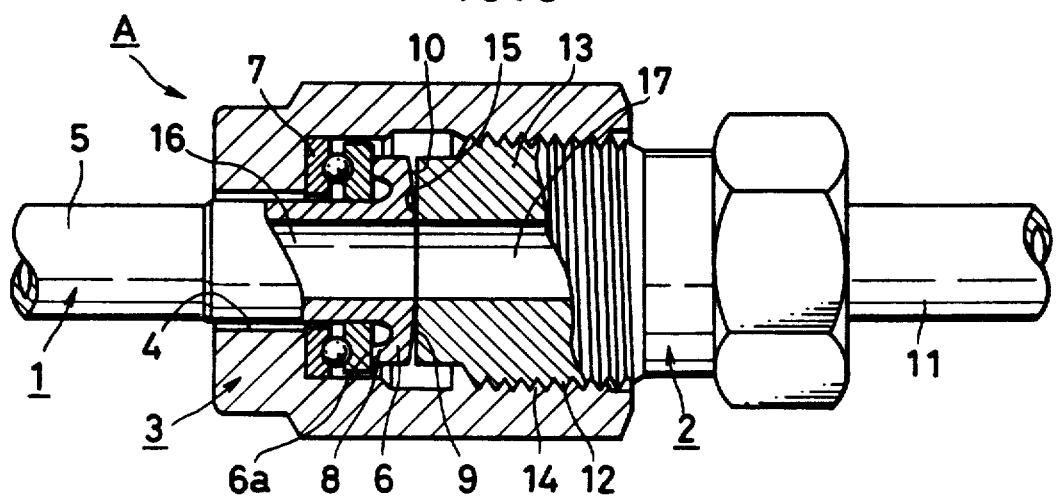
FIG. 3 is a partially sectional view of a second embodiment of this invention similar to FIG. 1.
Figure 4:
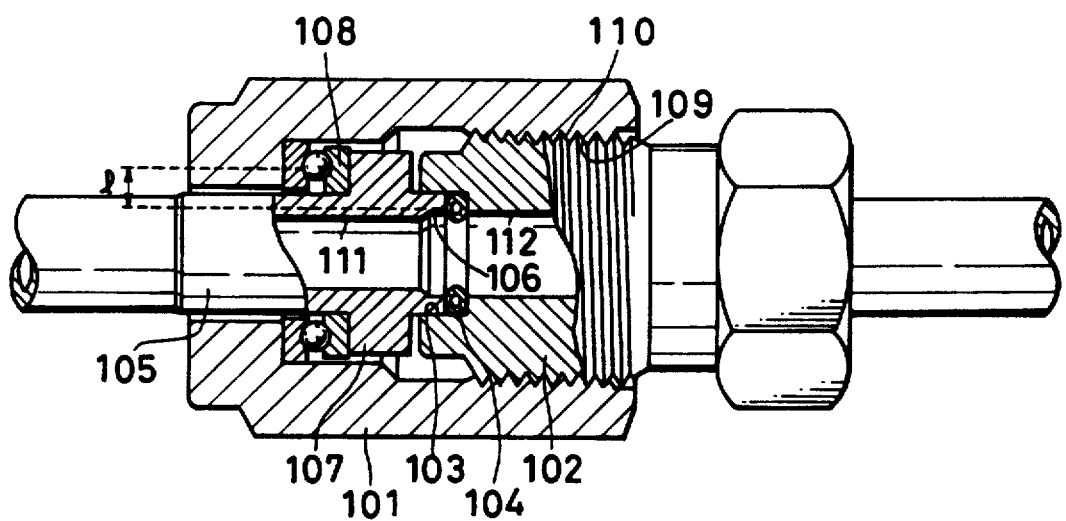
FIG. 4 is a partially sectioned view of a known coupling.

FIG. 3 illustrates a second embodiment wherein the members are the same as those in the first embodiment except that the center of a ball in a thrust bearing 10 coincides with the center of a receiving surface in a rear projection of a flange 6. Accordingly, fastening force for a female nut 3 is received by the center of the ball in the thrust bearing 10, whereby no unbalanced force is applied onto the thrust bearing to decrease damage on the thrust bearing 10.

The foregoing merely relates to preferred embodiments according to the present invention, but any modifications and changes could be made without departing from the scope of claims as follows:

What is claimed is:

1. A direct sealing coupling for engaging a body with a sleeve to form sealing by fastening force, the body comprising a substantially flat body having a sealing surface at one end a borethrough and a male thread;

the sleeve having a bore therethrough and having at one end a flange which comprises with an annular projection at one side to act as a belleville spring, the flange having at the other side a sleeve sealing surface which has a conical shape which is deformable to be substantially flat when pressed;

a connecting portion of the body and the sleeve being surrounded by a female nut, a female thread of which is engaged with said male thread on the body, thereby forming a seal between the body sealing surface and the sleeve sealing surface at the juncture of said bores, said bores being of the same size thereby providing a smooth uninterrupted path through said body and sleeve without circumferential dead space when a fastening force is applied onto the annular projection of the flange, a thrust bearing being provided between the female nut and the annular projection whereby to prevent rotation of the sleeve with the female nut when the fastening force is applied.

2. A direct sealing coupling as defined in claim 1 wherein the flange is constructed such that the center of a receiving surface of the annular projection coincides with the center of a ball in the thrust bearing to prevent the thrust bearing from being subject to unbalanced force.

* * * * *

UNITED STATES PATENT AND TRADEMARK OFFICE
CERTIFICATE OF CORRECTION

PATENT NO. : 5,160,178
DATED : NOVEMBER 3, 1992
INVENTOR(S) : TOSHIAKI IWABUCHI

It is certified that error appears in the above-identified patent and that said Letters Patent is hereby corrected as shown below:

Claim 1, Col. 3, line 26, delete "borethrough" and insert --bore therethrough--.

Signed and Sealed this

Fourteenth Day of March, 1995

Attest:

BRUCE LEHMAN

Attesting Officer

Commissioner of Patents and Trademarks